US005544478A

United States Patent [19]

Shu et al.

[11] Patent Number: 5,544,478
[45] Date of Patent: Aug. 13, 1996

[54] OPTICAL SENSING OF COMBUSTION DYNAMICS

[75] Inventors: Emily Y. Shu, Niskayuna; Dale M. Brown, Schenectady, both of N.Y.

[73] Assignee: General Electric Company, Schenectady, N.Y.

[21] Appl. No.: 339,843

[22] Filed: Nov. 15, 1994

[51] Int. Cl.$^6$ ...................................................... F02C 9/28
[52] U.S. Cl. ........................ 60/39.03; 60/39.281; 60/725
[58] Field of Search ........................... 60/39.03, 39.27, 60/39.281, 725

[56] References Cited

U.S. PATENT DOCUMENTS

4,735,052  4/1988  Maeda et al. ............................. 60/733
5,049,063  9/1991  Kishida et al. ............................ 431/78
5,093,576  3/1992  Edmond et al. .................... 250/370.01
5,257,496  11/1993  Brown et al. ........................... 60/39.06

Primary Examiner—Louis J. Casaregola
Attorney, Agent, or Firm—Marvin Snyder

[57] ABSTRACT

An optical radiation detector, such as a silicon carbide photodiode ultraviolet radiation detector, is employed for real time, noninvasive monitoring and diagnosis of combustion dynamics in gas turbine engines. The SiC photodiode responds to flame ultraviolet emission, and a Fast Fourier Transform spectrum analyzer peak acoustic frequency components of the detector signal as indicators of systematic gas pressure vibrations related to combustion. The combustion may be modified in accordance with the monitored acoustic frequency components.

20 Claims, 6 Drawing Sheets

OPTICAL SENSING OF COMBUSTION DYNAMICS

This application is related to D. M. Brown et al. patent application Ser. No. 08/339,845, filed concurrently herewith and assigned to the instant assignee.

BACKGROUND OF THE INVENTION

This invention relates to methods and apparatus for monitoring combustion dynamics within the combustor stage of a gas turbine engine.

Gas turbines are extensively used in power plants for a wide diversity of applications including, as examples, electric power generators in utility power plants, land based engines for gas fired electrical generator or pipeline compressors, and shipboard or airborne engines for, respectively, marine or aeronautical propulsion.

Gas turbines burn hydrocarbon fuel which may include natural gas or kerosene, which is used as an aviation (jet) fuel. As a result of the combustion process, such turbines emit an exhaust stream containing a number of combustion products, including various forms of nitrogen oxide, collectively referred to as "$NO_x$", which is considered a pollutant.

It is widely known that, for a gas turbine, $NO_x$ emissions increase significantly as the combustion temperature rises. It is also known that operating a turbine in a so-called "lean burn" condition, which involves use of a lean mixture of fuel and combustion air (i.e., a relatively low fuel-to-air ratio), reduces the combustion temperature to a level that significantly reduces $NO_x$ emissions.

Brown et al. Pat. No. 5,257,496, issued Nov. 2, 1993, entitled "Combustion Control for Producing Low $NO_x$ Emissions Through Use of Flame Spectroscopy" and related Brown patent application Ser. No. 08/226,528, filed Apr. 12, 1994, also entitled "Combustion Control for Producing Low $NO_x$ Emissions Through Use of Flame Spectroscopy", both of which are assigned to the instant assignee, disclose closed loop feedback control systems which achieve a lean burn by employing a silicon carbide (SIC) photodiode to sense combustion temperature through measurement of the intensity of ultraviolet radiation from a combustion flame and continuously adjusting the fuel/air ratio of the fuel mixture such that the ultraviolet radiation intensity remains below a predetermined level associated with a desired low level of $NO_x$ emissions. The SiC photodiode, which is located behind a sapphire or quartz window, responds to ultraviolet emissions of the flame and thereby responds to the intensity or temperature of the flame, since the photocurrent produced by the photodiode is proportional to the photon flux produced by the flame and impinging on the photodiode.

As a separate (but related) consideration, what is known as combustion dynamics is a critical parameter of a gas turbine, and is closely monitored. During the combustion process, the fuel and air mixture is ignited and burned in the combustor, producing extremely hot gas at high pressure. Dynamic pressure waves having an acoustic frequency range of from a few hundred hertz to a few thousand hertz occur during the process. If these dynamic pressure waves are not maintained at a sufficiently low level, mechanical damage can result. Further, gas turbine life decreases when its vibration is excessive, and the turbine may become too dangerous to operate because of those vibrations.

Moreover, it has been observed that lean burn conditions, which are desirable from the point of view of achieving low $NO_x$ emissions, exacerbate the problem of dynamic pressure waves being produced. If these dynamic pressure waves are not held to a sufficiently low level, they result in undesirable mechanical vibrations. Dynamic pressure wave minimization is usually accomplished by increasing flame temperature, thereby stabilizing the flame front. As a result, however, $NO_x$ emission cannot reach design specifications.

Accordingly, the ability to diagnose and control the dynamics of a turbine in real time is of critical importance, and monitoring combustion dynamics during normal operation once a turbine has been installed is essential.

A current and accepted practice is to detect and measure the dynamic pressure waves by employing a pressure transducer, typically one which includes a piezoelectric crystal and a tube having one end projecting into the combustion chamber so as to be exposed to pressure therein. The piezoelectric crystal is mounted at the other end of the tube. The tube thus serves to reduce the amount of pressure applied to the piezoelectric crystal to prolong the life of the pressure transducer. This sensor design reflects the difficult environment of a gas turbine insofar as sensors are concerned, where both high pressure and high temperatures are involved.

To monitor combustion dynamics in essentially real time, a frequency spectrum analysis of the pressure transducer output signal is accomplished by performing a Fast Fourier Transform operation. The acoustic waves at various frequencies are indicated as peaks in the frequency spectrum analysis.

While such pressure transducers provide relevant information, there are a number of significant disadvantages. The piezoelectric crystal is quite fragile, and frequently fails, causing difficulties and delays in testing of new turbine designs. Moreover, although desirable in principle, pressure transducers in practice typically are not left in place on installed turbines. Such would be desirable for accomplishing "lifetime" tracking of flame dynamics during operation of the turbine.

SUMMARY OF THE INVENTION

Accordingly, it is an object of the invention to provide methods and apparatus for monitoring and diagnosing combustion dynamics in the combustor stage of a gas turbine.

It is another object of the invention to avoid the various disadvantages of pressure transducers for monitoring combustion dynamics.

Briefly, in accordance with an overall aspect of the invention, the output signal of an ultraviolet radiation detector such as employed in the feedback control system of the above-identified Brown et al. Pat. No. 5,257,496, has spectral acoustic frequency components which coincide with the dynamic pressure waves measured by the pressure transducers described above. In the flame spectroscopy control systems of Brown et al. Pat. No. 5,257,496 and Brown patent application Ser. No. 08/226,528, the average DC signal level from the ultraviolet radiation detectors which track temperature is analyzed for the purpose of feedback control to maintain lean burn combustion for reduced $NO_x$ emissions while avoiding undue risk of flame out. In those flame spectroscopy systems, AC components of the radiation detector output signal are to be "noise" to be eliminated through appropriate filtering.

This discovery of the correlation or coincidence of spectral acoustic frequency components of the ultraviolet emission from the combustion flame with dynamic pressure waves characteristic of combustion dynamics is employed in accordance with the invention to monitor, control and maintain dynamic pressure vibrations within acceptable limits.

As part of the development of the present invention, it has been determined that, particularly during lean burn conditions, there is a spatial variation in the flame front, most notably in a forward to back direction, and that this spatial variation tracks the dynamic pressure waves as sensed by the known pressure transducers. Thus, particularly during lean burn conditions, the flame front burns in a pulsed manner.

In accordance with a more particular aspect of the invention, apparatus for monitoring combustion dynamics within a gas turbine combustor includes an optical radiation detector, such as a silicon carbide photodiode responsive to ultraviolet radiation, for detecting optical radiation from the combustion flame to produce a detector signal. A device is provided for recognizing at least one frequency component of the detector signal, such as a spectrum analyzer which presents frequency components of the detector signal as indicators of systematic vibrations related to combustion. Thus the output signal of the silicon carbide photodiode detector of the aforementioned flame spectroscopy systems contains additional useful information, which was not previously recognized. Specifically, the silicon carbide photodiode detector allows acquisition of the dynamic frequencies of the combustion simultaneously with the flame intensity data, thereby efficiently combining two functions in a single detector. In an approach that in effect implements normalization, the ratio of AC to DC signals from the detector is determined, thus providing quantitative information as to dynamic amplitudes of individual frequency components, which is relatively unaffected by variations in intensity of optical radiation due to non-flame-related reasons.

In addition to their use in feedback control as described in the above-identified Brown et al. Pat. No. 5,257,496 and Brown patent application Ser. No. 08/226,528, the spectral acoustic frequency components, being indicators of systematic vibrations, can be employed as additional sensor input signals for improved closed loop turbine control. Thus, the invention may be employed as a feedback control system wherein a control element of the combustor is dynamically adjusted in response to magnitudes of the frequency components. The flame temperature (DC signal) and pressure dynamics (AC signal) can both be taken into account to maintain the combustion process within acceptable, and even best case, limits.

While a silicon carbide ultraviolet radiation detector is presently preferred, other optical radiation detector types may alternatively be employed. These include detectors employing gallium phosphide photodiodes, silicon photodiodes, gallium nitride photosensitive devices, or gallium arsenide photosensitive devices.

In accordance with another aspect of the invention, a method of monitoring combustion dynamics within a gas turbine combustor comprises the steps of detecting optical emission from a combustion flame in the combustor to produce a detector signal indicative of the detected optical emission, and determining frequency components of the detector signal as indicators of systematic vibrations related to combustion. The detected optical emission may be in the ultraviolet range of wavelengths. Feedback control of combustion may be implemented by dynamically adjusting the combustible mixture in response to magnitudes of the frequency components of the detector signal. Further, the optical emission detector may be employed as an element of a flame intensity detector, and accordingly serve dual purposes.

The invention thus provides reliable methods and apparatus for real time and noninvasive monitoring and diagnosis of gas turbine combustion dynamics at high temperatures, and facilitates use of a silicon carbide photodiode for on/off flame detection as well as flame temperature sensing and combustion dynamics sensing.

BRIEF DESCRIPTION OF THE DRAWINGS

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION

Figure 1:
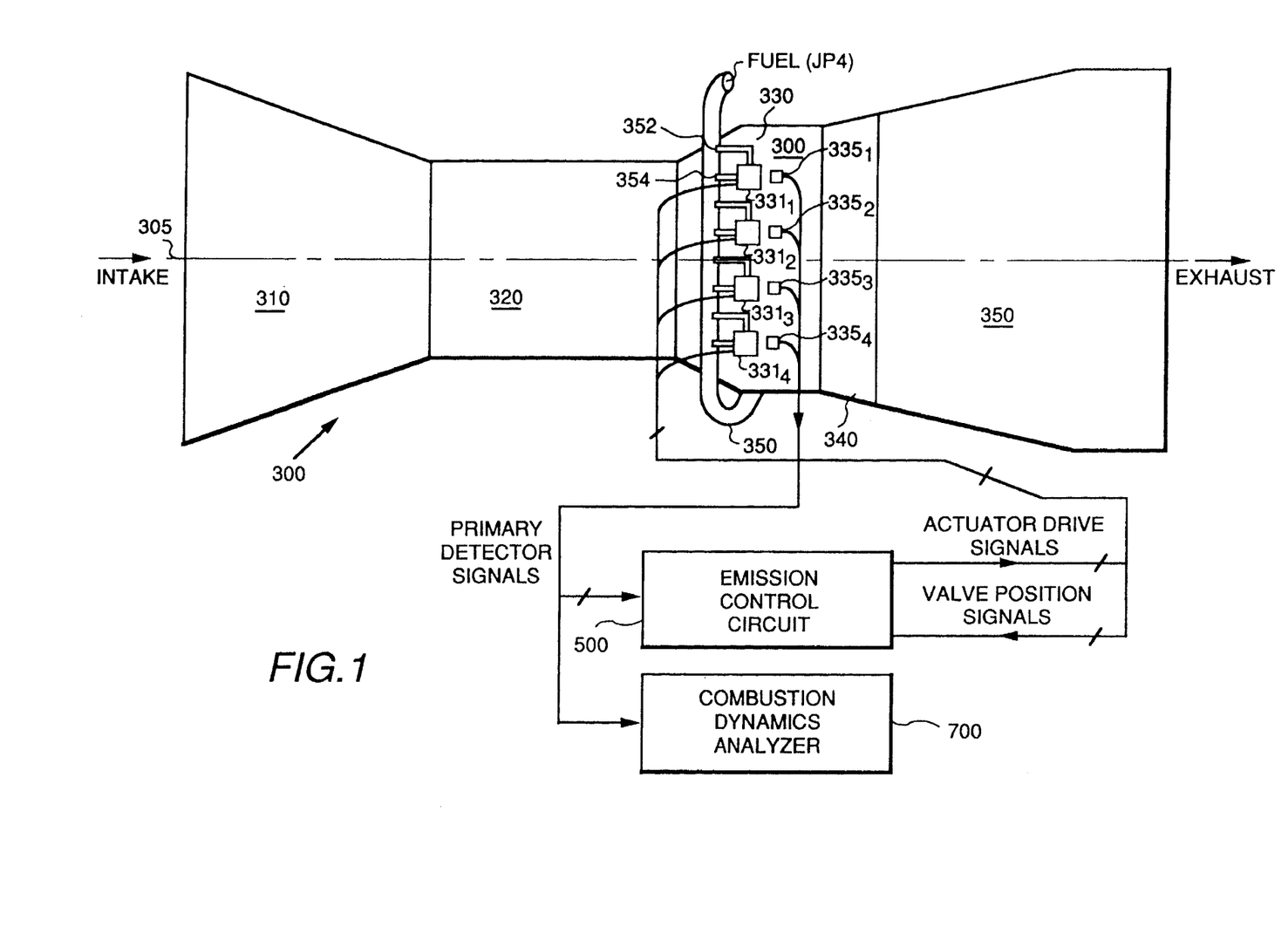
FIG. 1 is a simplified outline drawing of a jet engine incorporating the invention.

FIG. 1 is a simplified outline drawing of an aircraft jet engine 300 such as that shown and described in the above-identified Brown et al. Pat. No. 5,257,496 and Brown patent application Ser. No. 08/226,528. Jet engine 300 incorporates flame intensity feedback control in accordance with the inventions of Pat. No. 5,257,496 and application Ser. No. 08/226,528, as well as the sensing of combustion dynamics in accordance with the present invention.

Jet engine 300 contains five successive coaxially aligned conventional stages: low pressure compressor stage 310, high pressure compressor stage 320, combustor 330, high pressure turbine stage 340 and low pressure turbine stage 350. Collectively, low and high pressure compressor stages 310 and 320 compress incoming intake air to a desired high pressure for use as combustion air. Combustor 330 injects jet fuel, e.g. JP-4, into the combustion air, using a series of fuel injectors, and establishes controlled internal combustion of the resulting fuel/air mixture. Hot expanding exhaust gases generated by the combustion are successively routed to high and low pressure turbine stages 340 and 350, respectively, which collectively extract power from the exhaust gases to suitably drive compressor stages 310 and 320 through common shafting (not shown). The gases expelled by low pressure turbine stage 350 exit the engine as exhaust. Since stages 310, 320, 340 and 350 are conventional, they are not discussed in greater detail herein.

Combustor stage 330 contains a series of fuel injector assemblies 331, formed of individual injector assemblies $331_1, 331_2, 331_3, 331_4, \ldots$ (of which only four are shown)

situated at regular spacings completely around the periphery of an outer wall of the combustor stage and concentric with longitudinal axis 305 of the engine. Each of these assemblies, such as assembly $331_1$ which is discussed in greater detail below with reference to FIG. 2, includes a fuel injector which appropriately directs jet fuel into a combustion area, and a corresponding vernier valve to dynamically vary the fuel/air mixture for that particular fuel injector. The term "vernier valve" as used herein includes poppet valves which are positioned to be either opened or closed, for the purpose of finely adjusting the fuel supplied to the combustor flame.

Fuel manifold 350 is supplied with jet fuel from an appropriate fuel pump (not shown), and routes jet fuel in parallel to each of the injector assemblies. The fuel injectors and the corresponding vernier valves situated within the associated injector assembly are connected in parallel, through two separate fuel lines, to manifold 350, such as by fuel lines 352 and 354 for injector assembly $331_1$. If vernier valves are not employed, the amount of fuel supplied to each of the injectors is regulated by the diameter and length of the path traversed by the fuel through the manifold and associated fuel line, such as fuel line 354, and the flow rate at which fuel is pumped through the manifold to the engine. Ideally, since all the fuel lines that directly connect the fuel injectors to the manifold are approximately equal in size (both diametrically and lengthwise), all of the injectors should receive equal amounts of fuel directly from manifold 350. During engine manufacture and testing, the overall fuel/air mixture for the engine is set such that with, illustratively, all the vernier valves approximately half open, the engine operates in a desired lean-burn condition. This results in sufficiently high flame temperatures to prevent a flame-out condition but with substantially reduced levels of both CO and $NO_x$ emitted in the engine exhaust. Subsequently, each of the vernier valves is dynamically controlled to maintain the fuel/air mixture for its corresponding injector at a point such that the engine operates in the desired lean-burn condition.

An ultraviolet radiation detector is secured to the outer wall of the combustion stage near each respective injector assembly and, through a suitable high temperature optical window, monitors that portion of the flame. Thus a detector assembly 335, formed of individual ultraviolet radiation detectors $335_1$, $335_2$, $335_3$, $335_4$, . . . (only these four individual ultraviolet radiation detectors $335_1$, $335_2$, $335_3$ and $335_4$ are specifically shown) is mounted around the periphery of the outer surface of the combustion stage and concentric with longitudinal axis 305. Each individual ultraviolet radiation detector $335_1$, $335_2$, $335_3$, $335_4$, is mounted in the vicinity of a respective fuel injector assembly, though the exact spacing therebetween is not critical and, to some extent, is dictated by a designed flame geometry within the combustion stage.

Advantageously, ultraviolet radiation detectors $335_1$, $335_2$, $335_3$ and $335_4$ can serve dual functions. In particular, in the illustrated embodiment the average DC output signal level of ultraviolet radiation detectors $335_1$, $335_2$, $335_3$ and $335_4$ is optionally employed as an indicator of ultraviolet radiation intensity which tracks flame temperature in accordance with the inventions of the above-identified Pat. No. 5,257,496 and application Ser. No. 08/226,528. In addition, spectral frequency components (AC components) of the detector output signals are determined in accordance with the present invention in order to monitor combustion dynamics.

Illustrating the manner in which the inventions of Pat. No. 5,257,496 and Ser. No. 08/226,528 can optionally be employed in the same gas turbine engine, output signals of the individual ultraviolet radiation detectors $335_1$, $335_2$, $335_3$ and $335_4$ are routed to emission control circuit 500, described in detail in the above-incorporated Pat. No. 5,257,496 and application Ser. No. 08/226,528, as well as to a combustion dynamics analyzer 700 of the present invention.

Briefly, emission control circuit 500 generates suitable drive signals through use of both the output signals produced by the radiation detectors and valve position feedback signals produced by the fuel injector assemblies. Each drive signal is applied to a respective actuator (not shown) located within a corresponding fuel injector assembly. The respective actuator appropriately changes the position of an internal valve element within the vernier valve located in this assembly to increase or decrease the amount of fuel flowing to the corresponding injector and hence into the combustion chamber itself, thereby changing the fuel/air mixture associated with that injector. Each of the position feedback signals specifies the position of the valve element within the corresponding vernier valve. The position of each such element is thus dynamically adjusted to appropriately vary the fuel/air mixture for all the fuel injectors such that jet engine 300 continuously operates at a desired "lean-burn" condition.

In accordance with the present invention, combustion dynamics analyzer 700, described hereinbelow in detail with reference to FIGS. 3–5, includes a Fast Fourier Transform (FFT) spectrum analyzer for determining magnitudes of the various spectral acoustic frequency components of the ultraviolet radiation detector output signal to thereby monitor combustion dynamics.

Figure 2:
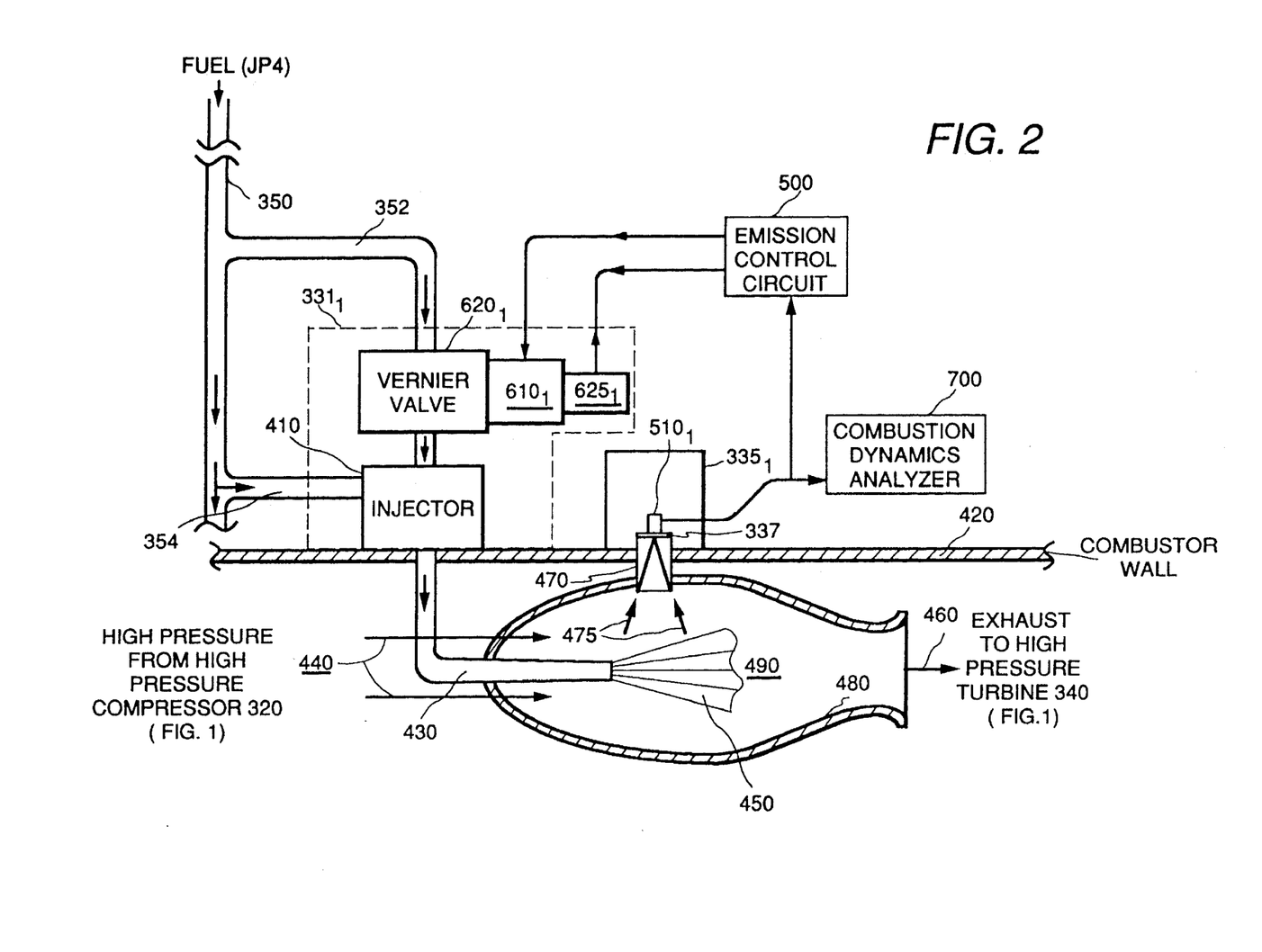
FIG. 2 is a simplified, partial sectional diagram of a portion of the combustor stage in the jet engine shown in FIG. 1.

FIG. 2 depicts a simplified, partly sectional diagram of a portion of combustor stage 330 in jet engine 300 shown in FIG. 1. As shown in FIG. 2, fuel injector assembly $331_1$ contains a vernier valve $620_1$, an actuator $610_1$, a position transducer $625_1$ and a fuel injector 410. Actuator $610_1$ has a common shaft (not shown) which is coupled both to an internal valve element within vernier valve $620_1$ and to position transducer $625_1$. The position of this shaft, monitored through the position transducer, sets the opening of the vernier valve.

Fuel injector 410 located within injector assembly $331_1$ is connected in parallel through two separate connections to fuel manifold 350: directly through fuel line 354, and via vernier valve $620_1$, through fuel line 352. Fuel flow occurs in the direction shown by the arrows within the fuel lines. Thus, based upon its setting, valve $620_1$ routes an additional amount of fuel to the injector beyond that flowing through fuel line 354. Injector 410 is joined with an injection nozzle assembly 430 which extends through combustor outer wall 420 and a flame shield 480 into combustion region 490. This nozzle assembly is oriented to spray fuel into a high pressure air stream 440 flowing through the combustion region. The sprayed fuel is ignited (through a conventional ignition device, not shown), resulting in a flame 450 within the combustion region, for which only a portion of the base of the flame is shown. The resulting combustion produces a hot exhaust gas stream 460 which is routed to high pressure turbine stage 340 (FIG. 1).

In order to monitor the ultraviolet emissions produced by combustion flame 450, an optical window 470 is appropriately mounted within combustor wall 420 and extends through flame shield 480. This window comprises any of a variety of appropriate well-known high temperature materials, such as quartz, which is substantially transparent to ultraviolet wavelengths above 200 nm. Compensation for coatings on the combustor side of the optical window 470 may be provided in the manner disclosed in Brown et al. application Ser. No. 08/339,845, filed concurrently herewith, entitled "Flame Sensor Window Coating Compensation".

Detector assembly $335_1$ contains an ultraviolet detector $510_1$, which is appropriately positioned to capture ultraviolet emissions through a viewing angle illustrated by rays 475, emanating from the base of the flame. Depending upon the size of ultraviolet detector $510_1$ and window 470, a suitable lens (not shown) may be interposed between window 470 and ultraviolet detector $510_1$, to concentrate incident emissions onto an active portion of detector $510_1$.

To provide excellent ultraviolet sensitivity and also proper operation at elevated temperatures (typically on the order of a few hundred degrees F) encountered near the external surface of combustor wall 420, a silicon carbide (SiC) photodiode is employed as ultraviolet detector $510_1$. One such photodiode, which is particularly useful for jet engine flame detection, is described in D. Brown et al. U. S. patent application "Silicon Carbide Photodiode with Improved Short Wavelength Response and Very Low Leakage Current," Ser. No. 07/878,937, filed May 5, 1992, now abandoned in favor of continuation application Ser. No. 08/198,679, filed Feb. 18, 1994 and assigned to the instant assignee. A silicon carbide photodiode is also disclosed in J .A. Edmond et al. U. S. Pat. No. 5,093,576, entitled "High Sensitivity Ultraviolet Radiation Detector."

SiC photodiodes are ideal sensors for working in a high temperature environment. SiC has absorption and thereby optical responsivity for wavelengths between approximately 200 nm to 400 nm, and accordingly does not respond to optical emissions in the visible and infrared range from black body radiation of the hot metal background within the gas turbine, as well as from hot particles which are part of the combustion flame. This is important because vibration of the combustion is being monitored, not vibration of the metal enclosure itself. Also, by comparison to silicon photodiodes, SiC photodiodes are stable at high temperatures, and require no special cooling. Further, SiC photodiodes take the form of rugged and compact solid state devices, which are easy to install and to maintain. Moreover, optical sensing is truly noninvasive; there is no direct contact between the flame and the photodiodes.

While SiC photodiodes are thus presently preferred, nevertheless almost any optical sensor responding to optical radiation in an appropriate visible or ultraviolet frequency range may be employed in the practice of the invention for monitoring and controlling combustion dynamics. Examples include gallium phosphide photodiodes responsive to wavelengths within the approximate range 350 nm to 580 nm, silicon photodiodes responsive to wavelengths within the approximate range 500 nm to 1,100 nm, gallium nitride photosensitive devices responsive to wavelengths within the approximate range 200 nm to 350 nm, gallium arsenide photosensitive devices responsive to wavelengths within the approximate range 400 to 800 nm, and combinations thereof. In some cases, it may be necessary to provide cooling for the sensor or sensors.

Figure 3:
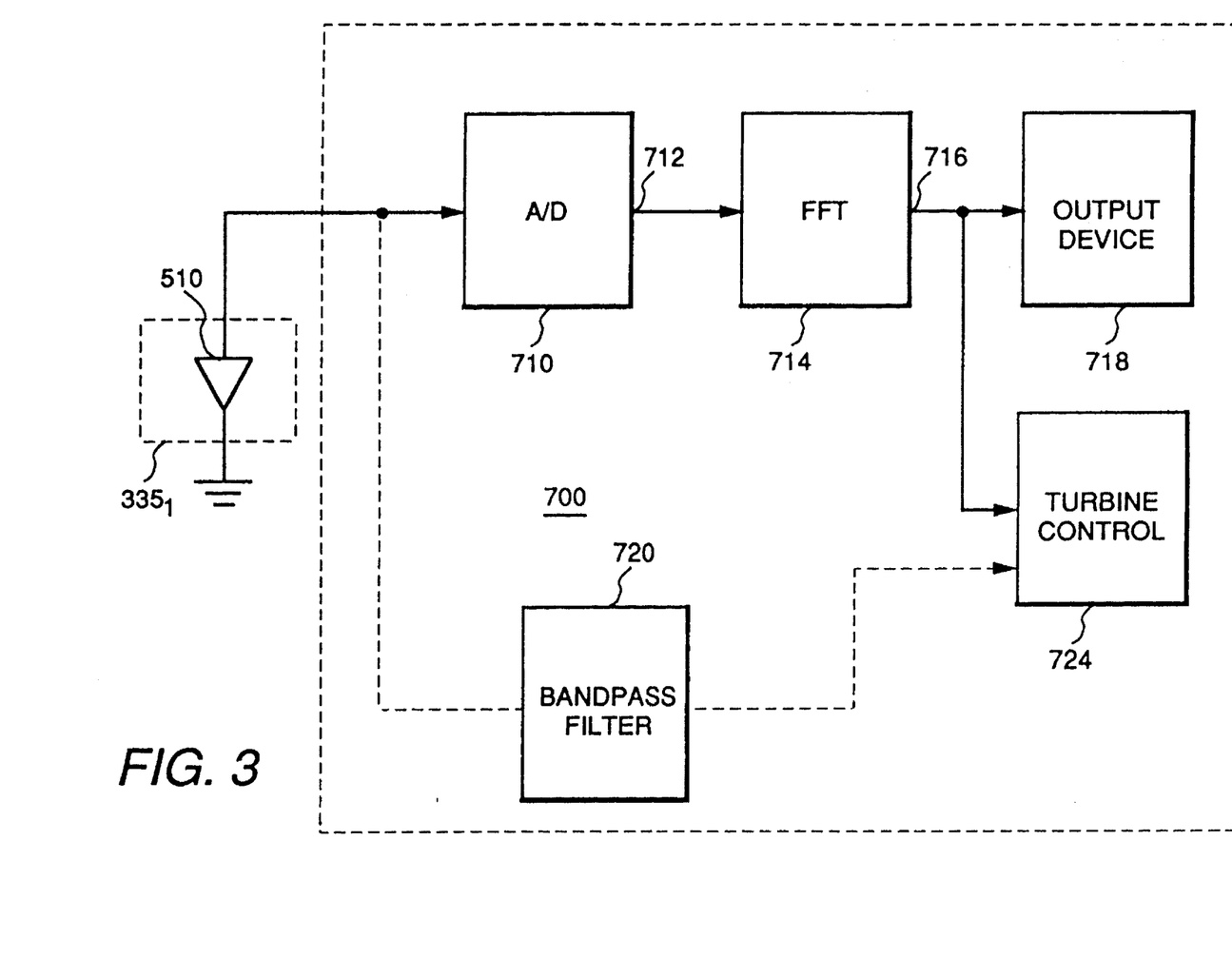
FIG. 3 is a block diagram of combustion dynamics analyzer elements employed in the present invention.

FIG. 3 is a high level block diagram of combustion dynamics analyzer 700 shown in FIG. 1, and its related components. A representative one $335_1$ of the ultraviolet radiation detectors, which contains SiC photodiode $510_1$, is coupled to analyzer circuit 700, and in particular to the input of an analog-to-digital converter 710 which is AC coupled to the output of SiC photodiode $510_1$ and is arranged to sample the output signal thereof at a sampling rate of about 10,000 samples per second in order to acquire data suitable for determining spectral frequency components of up to 1,000Hz. Output 712 of analog-to-digital converter 710 is connected to an input of a spectrum analyzer 714, which typically employs Fast Fourier Transform (FFT) techniques to determine the spectral frequency components of the signal from detector $335_1$ and provide them at an output 716. Spectrum analyzer 714 is a conventional device, and may comprise either dedicated hardware or a microcomputer appropriately programmed to perform the Fast Fourier Transform operation in essentially real time. In either event, it will be appreciated that analyzer 714 includes suitable memory elements (not shown) for temporarily storing sampled data points received from analog-to-digital converter 710.

Figure 4:
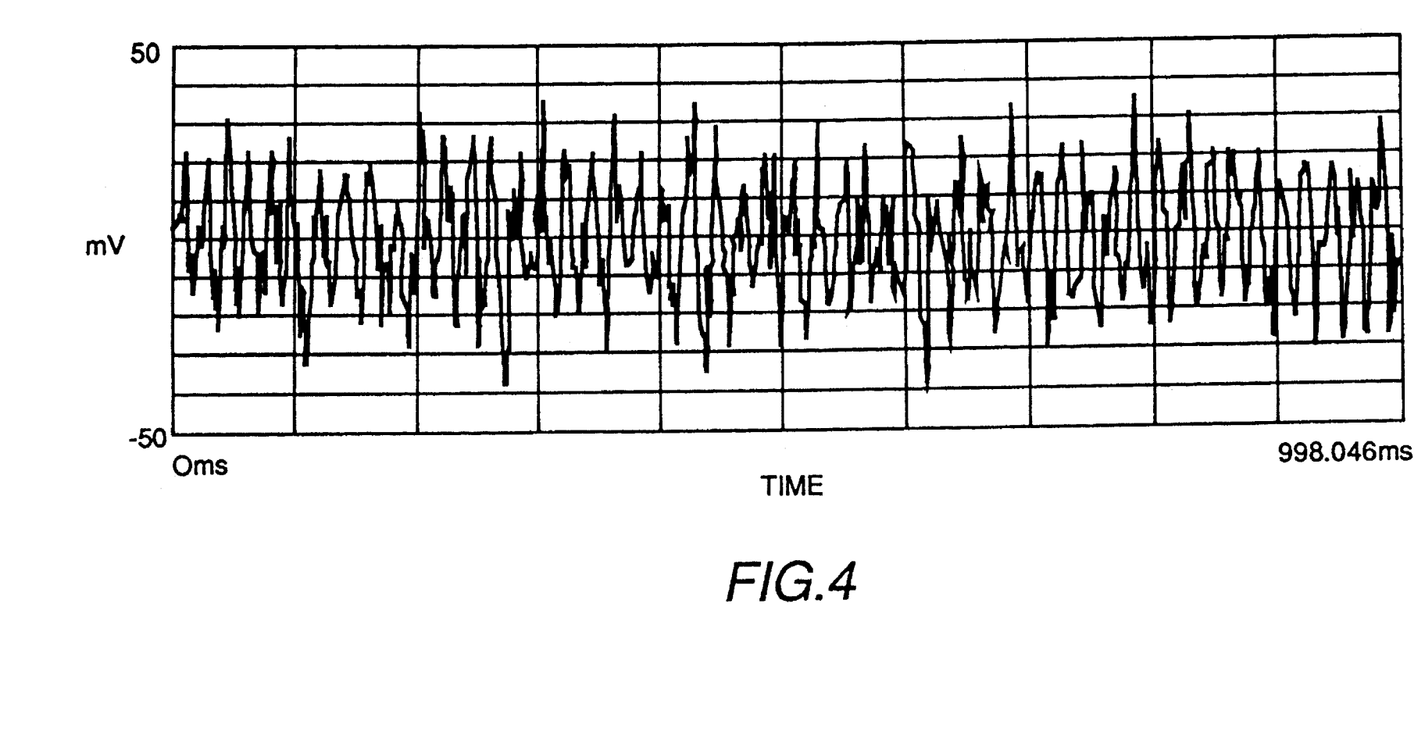
FIG. 4 is a graphical depiction of the output signal of an ultraviolet radiation detector as a function of time.

FIG. 4 graphically depicts, in the time domain, the output signal from ultraviolet radiation detector $335_1$ of FIG. 3 over a period of approximately one second, as sampled by analog-to-digital converter 710 of FIG. 3. (Although 60 Hz electrical pick-up noise and higher harmonics are present in the signal of FIG. 4, they can be eliminated with appropriate filtering or thorough shielding.)

Figure 5:
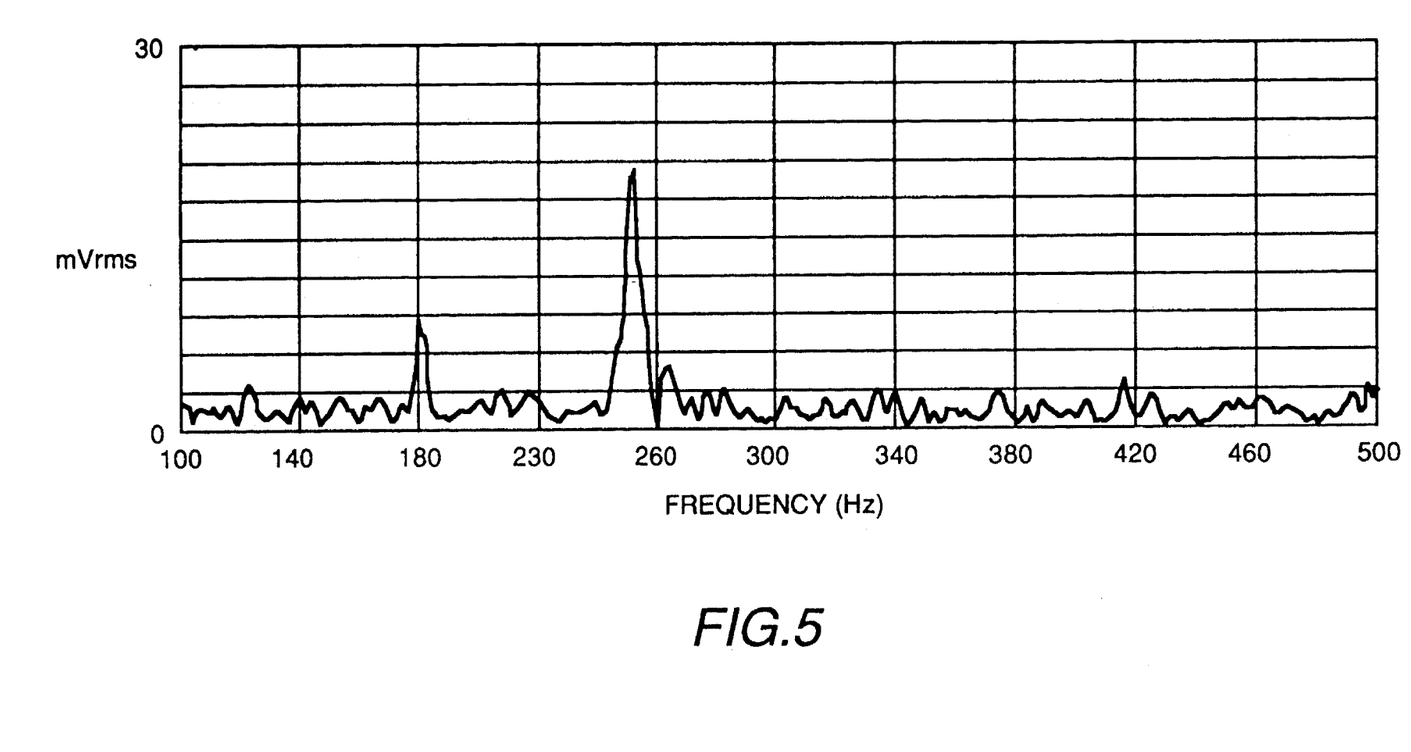
FIG. 5 is a graphical illustration of the spectral frequency components of the FIG. 4 detector signal as determined by a fast fourier transform.

FIG. 5 graphically depicts, in the frequency domain, spectral components of the FIG. 4 time domain signal, as produced in the apparatus of FIG. 3 at output 716 of spectrum analyzer 714. In the particular example presented herein, and as readily apparent in FIG. 5, a significant peak is present at 251 Hz, which is a longitudinal vibration frequency produced by the gas combustion process.

As shown in FIG. 3, output 716 of spectrum analyzer 714 is connected to a suitable output device 718 which presents, and optionally records, the results of the acoustic frequency spectrum analysis corresponding to FIG. 5.

As an alternative to use of A/D converter 712 and spectrum analyzer 716, an audio frequency bandpass filter 720 may be provided for isolating and tracking amplitude variations of a particular one or ones of the spectral peaks representing major acoustic frequency spectral components in the output signal of radiation detector $335_1$, as may be determined for a particular turbine design. Conceptually, bandpass filter 720 is shown coupling (through connections indicated by dashed lines) the output of ultraviolet radiation detector $335_1$ to turbine control 724 and output device 718, but various alternatives are possible; for example, bandpass filter 720 could be included as a part of spectrum analyzer 714. Bandpass filter 720 may comprise, as examples, a passive filter, an active filter, or a Digital Signal Processing (DSP) filter. In any event, the function of filter 720 is to recognize at least one acoustic frequency spectral component, and provide an output signal indicative of the magnitude thereof.

Figure 6:
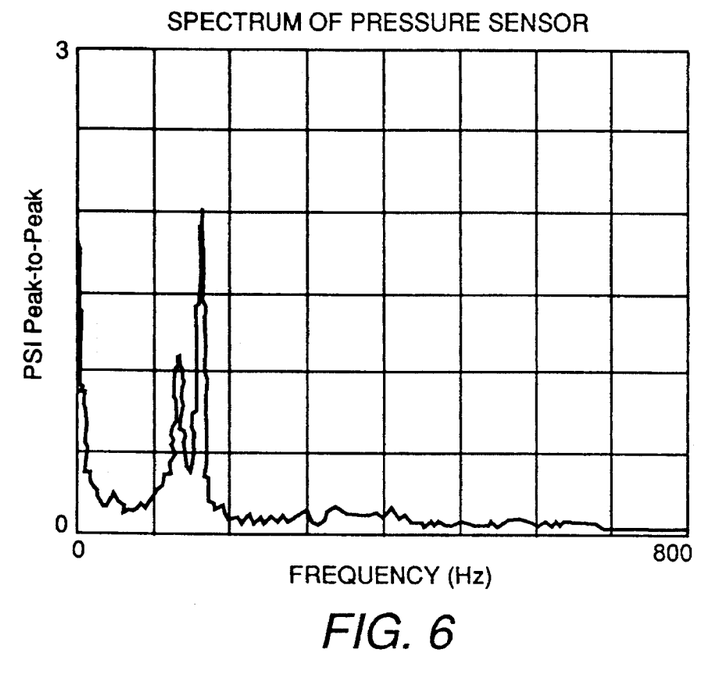
FIG. 6 is a graphical illustration of acoustic frequency spectral components of a piezoelectric pressure transducer signal.
Figure 7:
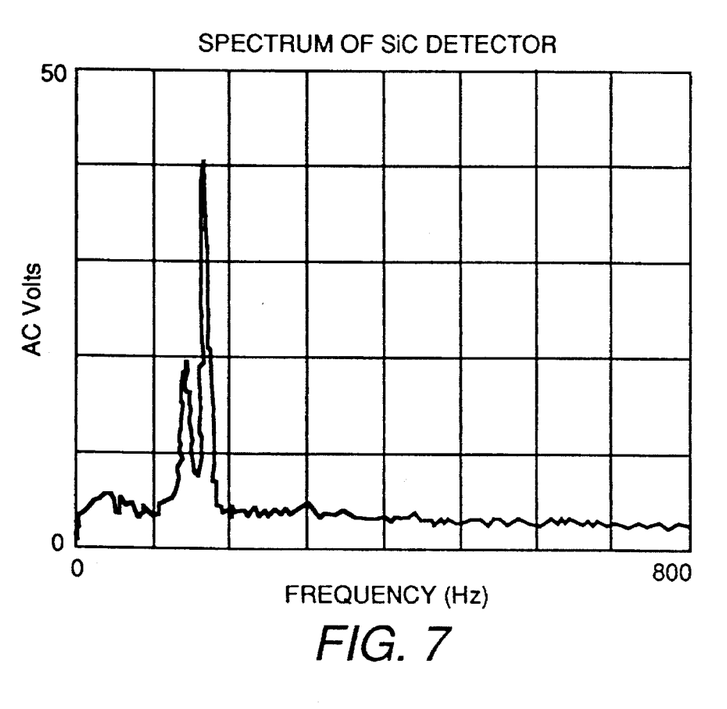
FIG. 7 is a graphical illustration of acoustic frequency spectral components of an SiC photodiode radiation detector signal, measured simultaneously with a pressure measurement by the pressure transducer shown in FIG. 6.

The spectrum analysis of FIG. 5 corresponds to the acoustic frequency spectrum based on the output signal of a conventional piezoelectric pressure transducer mounted close to ultraviolet radiation detector $335_1$, thus establishing that the same information regarding combustion dynamics can be obtained, but with greater reliability, and noninvasively, through use of an ultraviolet radiation detector. Consequently, an aspect of the invention stems from the discovery of the correlation or coincidence of spectral acoustic frequency components of the ultraviolet emission from the combustion flame with dynamic pressure waves characteristic of the combustion dynamics. In this regard, FIG. 6 graphically depicts, in the frequency domain, spectra resulting from FFT analysis of the output signal from a piezoelectric pressure transducer, and FIG. 7 graphically depicts, in the frequency domain, spectra resulting from FFT analysis of the output signal from a SiC ultraviolet radiation detector simultaneously acquiring data during operation of the same gas turbine. There is a close correlation of the major peaks with reference to frequency, and a relationship with reference to amplitude. One difference between the spectra of FIGS. 6 and 7 is that in the FIG. 7 spectrum resulting from the SiC optical detector there is no "zero frequency" (DC) component because the sensor signal was AC coupled prior to the spectrum analyzer.

With reference to FIG. 3, combustion dynamics parameters as determined by the analysis produced by spectrum analyzer 714 can be applied to a turbine control element 724 as an additional feedback parameter. Thus balancing of the flame temperature (DC signal) and pressure dynamics (AC signal) can be done to maintain the combustion process within acceptable (best case) limits. An alternative is to provide turbine control element 724 with the output signal from bandpass filter 720 instead of from spectrum analyzer 714.

In a further aspect of the invention, the dynamic amplitudes of individual frequency components may be quantitatively determined by taking the ratio of AC and DC detector signal components. The quantitative dynamics information thus determined is relatively unaffected by variations in optical radiation intensity which are due to non-flame-related reasons.

Accordingly, optical, and particularly ultraviolet, radiation detection can be employed with confidence to monitor combustion dynamics of a gas turbine combustor during the critical design and testing periods. In addition, the ultraviolet radiation detectors and an associated combustion dynamics analyzer can be included in installed turbines to facilitate "lifetime" tracking of flame dynamics. Accurate calibration of the optical radiation detector is not required insofar as the magnitudes of the acoustic frequency spectral components are concerned; approximate calibration against the prior art piezoelectric pressure transducer is sufficient and can be accomplished either during the engineering phase, or in the field. Moreover, SiC photodiodes can combine in a single device a number of functions, including on/off flame detection and flame temperature sensing, as disclosed in the above-identified Brown et al. Pat. No. 5,257,496 and application Ser. No. 08/226,528, and the combustion dynamics monitoring of the present invention.

While only certain preferred features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A system for monitoring combustion dynamics within a gas turbine combustor, comprising:

an optical radiation detector for detecting optical emission from a combustion flame in the combustor to produce a detector signal; and apparatus for recognizing at least one peak frequency component of the detector signal as an indicator of a systematic gas pressure vibration related to combustion.

2. The system of claim 1, wherein said apparatus for recognizing at least one peak frequency component comprises a spectrum analyzer for determining peak frequency components of the detector signal as indicators of systematic gas pressure vibrations related to combustion.

3. The system of claim 1, wherein said optical radiation detector comprises an ultraviolet radiation detector.

4. The system of claim 1, wherein said optical radiation detector comprises a silicon carbide photodiode for detecting ultraviolet radiation.

5. The system of claim 1, wherein said optical radiation detector comprises at least one of the group consisting of silicon carbide photodiodes, gallium phosphide photodiodes, silicon photodiodes, gallium nitride photosensitive devices, gallium arsenide photosensitive devices, and combinations thereof.

6. The system of claim 2, wherein said optical radiation detector comprises an ultraviolet radiation detector.

7. The system of claim 2, wherein said optical radiation detector comprises a silicon carbide photodiode for detecting ultraviolet radiation.

8. The system of claim 2, wherein said optical radiation detector comprises at least one of the group consisting of silicon carbide photodiodes, gallium phosphide photodiodes, silicon photodiodes, gallium nitride photosensitive devices, gallium arsenide photosensitive devices, and combinations thereof.

9. The system of claim 1, including a control element for dynamically controlling application of combustion fuel and air to the combustor in response to magnitude of the at least one peak frequency component of the detector signal.

10. The system of claim 1, wherein said apparatus for recognizing at least one peak frequency component comprises a bandpass filter.

11. The system of claim 10, wherein said optical radiation detector comprises an ultraviolet radiation detector.

12. The system of claim 10, wherein said optical radiation detector comprises at least one of the group consisting of silicon carbide photodiodes, gallium phosphide photodiodes, silicon photodiodes, gallium nitride photosensitive devices, gallium arsenide photosensitive devices, and combinations thereof.

13. A method of monitoring combustion dynamics within a gas turbine combustor, comprising:

detecting optical emission from a combustion flame in the combustor to produce a detector signal; and monitoring at least one peak frequency component of the detector signal as an indicator of a systematic gas pressure vibration related to combustion.

14. The method of claim 13 wherein the step of monitoring at least one peak frequency component of the detector signal comprises taking the ratio of AC and DC detector signal components to determine dynamic amplitude of the at least one frequency component.

15. The method of claim 13 wherein the step of detecting optical emission from a combustion flame comprises detecting ultraviolet radiation emitted by said flame.

16. The method of claim 13 including the additional step of dynamically controlling application of combustion fuel and air to the combustor in response to magnitude of the at least one frequency component.

17. The method of claim 13 including the additional step of utilizing the detected optical emission as an indication of flame intensity.

18. A method of monitoring combustion dynamics within a gas turbine combustor, comprising:

detecting optical emission from a combustion flame in the combustor to produce a detector signal; and monitoring a plurality of peak frequency components of the detector signal as an indicator of a systematic gas pressure vibration related to combustion.

19. The method of claim 18 wherein the step of monitoring a plurality of peak frequency components of the detector signal comprises taking the ratio of AC and DC detector signal components to determine dynamic amplitudes of the plurality of peak frequency components.

20. The method of claim 18 including the additional step of controlling application of combustion fuel and air to the combustor in response to magnitudes of the plurality of peak frequency components.

* * * * *